United States Patent [19]

Pannbacker

[11] Patent Number: 4,733,920
[45] Date of Patent: Mar. 29, 1988

[54] MOTOR VEHICLE BRAKE ANTILOCKING SYSTEM

[75] Inventor: Helmut Pannbacker, Hemmingen, Fed. Rep. of Germany

[73] Assignee: WABCO Westinghouse Fahrzeugbremsen GmbH, Hanover, Fed. Rep. of Germany

[21] Appl. No.: 794,819

[22] Filed: Nov. 4, 1985

[30] Foreign Application Priority Data

Nov. 3, 1984 [DE] Fed. Rep. of Germany ....... 3440244

[51] Int. Cl.$^4$ ............................................. B60T 8/02
[52] U.S. Cl. ..................................... 303/106; 303/97
[58] Field of Search .................... 303/100, 96, 97, 105, 303/106

[56] References Cited

U.S. PATENT DOCUMENTS

| 3,727,992 | 4/1973 | Bowler et al. | 303/100 |
| 3,774,977 | 11/1973 | Fink et al. | 303/97 |
| 3,804,469 | 4/1974 | Takeuchi et al. | 303/106 |
| 3,888,548 | 6/1975 | Sharp | 303/97 |

FOREIGN PATENT DOCUMENTS 1603459 11/1981 United Kingdom ............... 303/106

Primary Examiner—John W. Caldwell, Sr.
Assistant Examiner—Alvin Oberley
Attorney, Agent, or Firm—J. O. Ray, Jr.

[57] ABSTRACT

An antilocking system is being proposed which does not generate unplanned control signals when axle oscillations occur. To this purpose, a threshold value stage 6 for the wheel deceleration signals (−b) has an increased threshold value. After separation of the wheel velocity $V_R$ from the vehicle reference velocity $V_{ref}$, this value is again decreased in stages so that a normal controlled braking process is not affected.

15 Claims, 4 Drawing Figures

MOTOR VEHICLE BRAKE ANTILOCKING SYSTEM

BACKGROUND OF THE INVENTION

The present invention relates in general to a motor vehicle braking system and, more particularly, this invention relates to a system which will minimize an unintentional response of a respective brake solenoid control valve due to an axle oscillation, and which will prevent locking of a respective braked wheel when such respective braked wheel is subjected to a full brake application, even on a slippery highway surface.

In order to reduce the stopping distance of a motor vehicle, especially on a relatively slick road surface, it is known in the braking art that locking of the brakes on a respective wheel being subjected to a full brake application must be avoided. Furthermore, it is known that when such locking of the brakes is prevented, the operator of such vehicle can retain enhanced steering capabilities.

It is likewise generally recognized in the braking art that when the rotary deceleration (−b) of a respective braked wheel exceeds a certain threshold value, then the locking of such respective braked wheel will normally occur. The threshold value normally ranges above the value that is to be expected for the highest possible retardation of such vehicle without experiencing the undesirable locking of the respective braked wheels.

Prior to the present invention, a motor vehicle brake antilocking system had been developed and used. This known brake antilocking system reacts to a signal that is representative of a respective wheel rotary deceleration (−b) with a resulting reduction of the brake pressure within a brake cylinder of such respective braked wheel by activation of an associated solenoid control valve.

However, it has been determined in use that with this particular antilocking system, an undesirable control signal can be generated, which temporarily actuates the solenoid control valves. It has been found that this may occur even during normal travel conditions. For example, these undesirable control signals have been generated either with or without the brakes on such vehicle being applied. This false activation of such solenoid control valves results in their added wear and subsequent required repair and/or replacement which, in turn, adds to the maintenance cost for the vehicle owner.

Persons skilled in the braking art believe that one of the primary causes of such detrimental control signals is the occurrence of the so-called axle oscillation. As used in this specification, the term "axle oscillation" is understood to mean a torsional oscillation of the wheels with an approximate frequency of between about 8 Hertz and about 10 Hertz. Such torsional oscillation of the wheels can be caused, by way of example, from a relatively severe unevenness of the roadway surface. An axle oscillation of this type may also occur during a partial braking process. In either case, such axle oscillation will usually result in an undesirable loss of pressure for the brake cylinders due to the responding of the solenoid control valve to an undesirable control signal.

In order to eliminate this erratic performance of the electronic antilocking system, it was believed possible that a manometric switch could be installed within the braking circuitry of such vehicle. In this type of arrangement, the electronic antilocking system would be actuated by the manometric switch when and only when a particular preselected pressure was present. This task is accomplished, in this case, by switching back to a reduced value a previously, constantly increased threshold value for the rotary deceleration (−b) upon reaching such preselected pressure. However, even in this arrangement, it is still possible that, in the event of a partial brake application on such vehicle, there may occur unnecessary solenoid control valve actuations in the antilocking system. Of even greater concern is the possible danger that could be encountered if a manometric switch developed a fault, which could cause the antilocking system to respond to a control signal too late. Furthermore, this arrangement has the added disadvantage of significantly increasing the cost associated with such antilocking system, not only because of the cost of the manometric switch, but also because of the necessary extra electrical connections required to install such manometric switch to the electronic circuitry of such antilocking system.

Further known in the braking art from German Patent No. 2,726,738, the teachings of which are incorporated herein by reference thereto, is to detect an axle oscillation through generation of a (+b) signal which is representative of wheel-turning acceleration, and to then raise the rotary deceleration (−b) threshold. Although this arrangement will usually prevent the generation of an erroneous control signal, the possibility still exists with this system, that due to the increased (−b) threshold, a subsequent controlled braking process will not proceed at an optimum level.

SUMMARY OF THE INVENTION

An antilocking mechanism, and a method of operating such mechanism in conjunction with a motor vehicle braking system is provided. Such antilocking mechanism, when operated according to the invention, will substantially minimize the generation of unplanned and erroneous control signals when an axle oscillation occurs on such vehicle for whatever reason. This is accomplished in an economical manner by positioning a plurality of wheel speed sensors on such motor vehicle, which are equipped to generate signal values representative of such vehicle acceleration and deceleration. Each of the acceleration and deceleration signals have a threshold value stage, and are supplied to a logic circuit. The logic circuit is designed such that upon exceeding predetermined accelerations and decelerations of the wheels on such vehicle, it will send appropriate control signals to respective solenoid control valves which control an associated brake cylinder pressure. The threshold value for the deceleration signals has an increased threshold value as compared to a normal value considered favorable for a controlled braking of such vehicle, until such time as the separation of the respective wheel velocity ($V_R$) from the vehicle reference velocity ($V_{ref}$) has occurred. At the time such separation occurs, the deceleration threshold value can be decreased in stages without adversely affecting controlled braking of such vehicle.

OBJECTS OF THE INVENTION

It is, therefore, one of the objects of the present invention to provide an antilocking mechanism for a motor vehicle braking system, which minimizes the occurrence of unplanned responses of a respective solenoid control valve due to erroratic control signals caused by axle oscillation.

Another object of the present invention is to provide a method of operating such antilocking mechanism in conjunction with such braking system, which provides controlled braking on such motor vehicle.

Still another object of the present invention is to provide an antilocking mechanism and a method of operating such mechanism, which substantially eliminates the generation of undesirable control signals.

Yet another object of the present invention is to provide an antilocking mechanism and a method of operating such mechanism in conjunction with a vehicle braking system, which minimizes the frequency of unwarranted pressure loss from respective brake cylinders of such vehicle braking system.

It is an additional object of the present invention to provide an antilocking mechanism and a method of operating such mechanism to provide optimum controlled braking of such vehicle.

A further object of the present invention is to provide an antilocking mechanism for a motor vehicle braking system, which is relatively inexpensive both to install and to maintain in operation.

In addition to the above, various other objects and advantages of the present invention will become more readily apparent to those persons skilled in the motor vehicle braking art from the following more detailed description of the antilocking mechanism, constructed according to the principles of the present invention, when such description is taken in conjunction with the several views of the drawing and the appended claims.

BRIEF DESCRIPTION OF THE INVENTION

Prior to proceeding to the detailed description of the present invention, a few general definitions of a number of terms to be used in the specification and claims are deemed necessary.

As used herein, the term "motor vehicle" or "vehicle" shall apply to trucks as well as to automobiles and other wheeled vehicles. The term "braking system" applies to systems which respond to either pneumatic or hydraulic pressure. The term "respective wheel" may apply to either a single wheel or to a dual wheel positioned adjacent one end of an axle.

Figure 1:
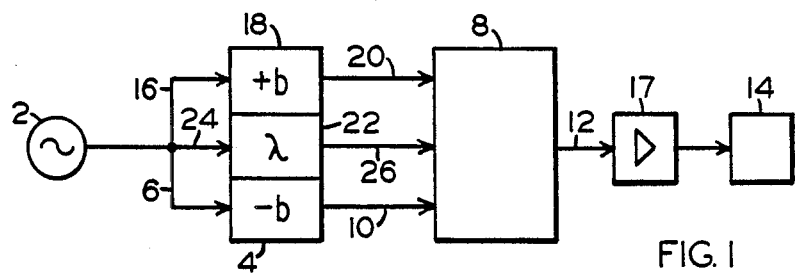
FIG. 1 is a schematic representation, in a simplified block form, of the antilocking mechanism which is constructed according to the principles of a presently preferred embodiment of the invention.

Now refer more particularly to FIG. 1, which is a schematic representation of a block circuit diagram of a presently preferred embodiment of an antilocking mechanism used in conjunction with a motor vehicle braking system.

The motor vehicle (not shown) will include at least four respective wheels (not shown). For simplicity of the description, only one wheel speed sensing means 2 is shown; however, there will be a speed sensing means 2 associated with each respective wheel on such vehicle. The speed sensing means 2 is secured to such motor vehicle closely adjacent its respective wheel. Each speed sensing means 2 will include a signal generating means 3 for generating a signal having a value that is representative of at least the deceleration (-b) of such each respective wheel. In the presently preferred practice of the invention, each speed sensing means 2 will also include a second signal generating means 13 for generating a second signal having a value that is representative of an acceleration (+b) of such each respective wheel. Each of the first signal generating means and the second signal generating means is connected to the speed sensing means 2; and in the presently preferred practice of the invention, is manufactured integral therewith.

A signal evaluation and detection means 4 is secured to such motor vehicle, and is connected to receive the first signal from the speed sensing means 2 via line 6. The first signal is evaluated, in the evaluation portion of signal evaluation and detection means 4, with respect to a first preselected threshold value which is larger than a normally favorable value in a controlled braking application for such motor vehicle. The detection portion of the evaluation and detection means 4 detects when a respective wheel velocity $V_R$ starts to separate from the vehicle reference velocity $V_{ref}$. A decreasing means 11 is included as a part of signal evaluation and detection means 4, which decreases in stages, the first threshold value, once the respective wheel velocity starts to separate from the vehicle reference velocity.

Logic control circuit means 8, positioned on such motor vehicle, is connected to receive a signal via line 10, from first signal evaluation and detection means 4. Logic control circuit means 8 generates an antilock control signal, according to a preset program, when the first signal value exceeds the first preselected threshold value. Included in logic control circuit means 8, is an antilock control signal transmitting means 9. Antilock control signal transmitting means transmits the antilock control signal, via line 12, to a respective solenoid control valve 14. Solenoid control valve 14 adjusts the fluid pressure response in an associated brake cylinder (not shown) in response to the antilock control signal.

In the presently preferred practice of the invention, an amplifier means 17 to amplify the antilock control signal, is disposed intermediate logic control circuit means 8 and solenoid control valve 14.

According to the most preferred practice of the invention, as presently contemplated, the antilocking mechanism further includes a second signal generating means 13 connected to each of the plurality of speed sensing means 2. Second signal generating means generates a second signal having a value that is representative of an acceleration (+b) of such each respective wheel on such motor vehicle.

The second signal is transmitted, via line 16, to a signal evaluation means 18, which evaluates the second signal with respect to an acceleration second preselected threshold value. The evaluated second signal is transmitted, via line 20, to the logic control circuit means 8 when the evaluated second signal exceeds the acceleration second preselected threshold value. In this practice of the invention, the second evaluated signal is transmitted also to the signal evaluation and detection means, so that connection of the first threshold value will be initiated when a wheel acceleration, caused by an axle oscillation on such motor vehicle, exceeds a predetermined value.

Further, according to the presently contemplated preferred embodiment of the invention, the antilocking mechanism includes a wheel slippage evaluation device 22, connected to receive a signal, via line 24, from speed sensing means 2; and to transmit, via line 26, a wheel slippage signal to the logic control circuit means 8. The wheel slippage signal is transmitted to logic control circuit means 8 when wheel slippage of a respective wheel exceeds a predetermined threshold value. Logic control circuit means 8 transmits the antilock control signal, via line 12, to the solenoid control valve 14, only when the deceleration signal and the acceleration signal and the wheel slippage signal all exceed their respective threshold values.

The signal evaluation and detection means 4 and the signal evaluation means 18 can be incorporated into a single unit, if desired. Furthermore, such single unit may also include the wheel slippage evaluation device 22.

In an alternative embodiment of the present invention, the signal evaluating and detection means 4 further includes a means 28 for adjusting the first threshold value to a relatively high value when such motor vehicle is undergoing normal operation, thereby suppressing the signal from the signal evaluating and detecting means 4.

Alternat,ively, the antilocking mechanism can also include a means 29 which transmits a signal from the logic control circuit means 8 to the signal evaluating and detection means 4, so that increase of the first threshold value is inhibited during a continuous controlled braking of such motor vehicle.

Figure 2:
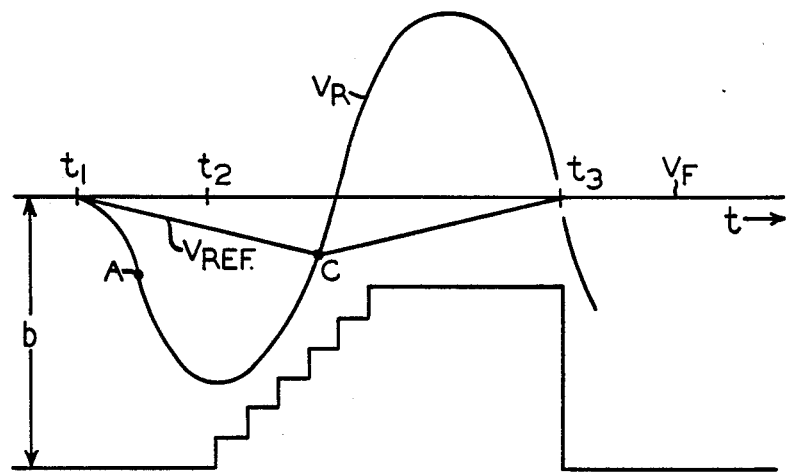
FIG. 2 is a view, in graphical form, which plots a respective wheel velocity and the vehicle reference velocity versus a time interval during an axle oscillation occurrence on such vehicle.

The wheel velocity $V_R$ for a respective wheel, caused by an incipient axle oscillation, is schematically recorded in FIG. 2 versus the time t. Axle oscillation starts at point in time $t_1$. Here, the wheel velocity $V_R$ starts to diverge downward from the vehicle reference velocity $V_{ref}$.

The vehicle reference velocity $V_{ref}$ is a quantity simulated within the antilocking electronics for the actual vehicle velocity $V_F$. The reference velocity $V_{ref}$ follows, with delay action, the wheel velocity $V_R$.

·Under normal circumstances, i. e., during nondecelerated or uncontrolled travel, respectively, the (−b) threshold has a relatively high value. This causes a (−b) signal to be suppressed, which might have been generated in about point A due to axle oscillation.

After a predetermined time $(t_1−t_2)$, the (−b) threshold is reduced in stages, starting from time $t_2$; also the axle oscillation amplitude starts to decrease from this point in time. As soon as the velocities $V_R$ and $V_{ref}$ coincide once more (time $t_3$), the (−b) threshold goes back up to the old value. The rise of the vehicle reference velocity after intersection C is chosen, so that at time $t_3$ the reference velocity is in a slightly lower range than the actual vehicle velocity.

Figure 3:
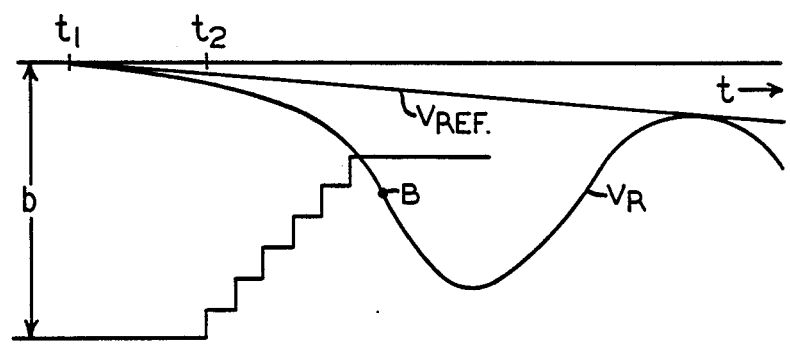
FIG. 3 is a view, in graphical form, which plots a respective wheel velocity and the vehicle reference velocity versus a time interval which occurs during a controlled braking application on such vehicle.

In FIG. 3, an antilocking control process is plotted versus the time t. It has a considerably greater time period than the axle oscillation. At time $t_1$, the wheel velocity $V_R$ starts to separate from the vehicle reference velocity $V_{ref}$. Starting from time $t_2$, the (−b) threshold is again reduced in stages. In this circumstance, a (−b) signal is generated at point B, since the (−b) threshold already has a low value here. Subsequently, the logic control circuit means 8 causes the respective brake to be released and, as a result, the wheel velocity $V_R$ once more approaches the vehicle reference velocity $V_{ref}$.

Figure 4:
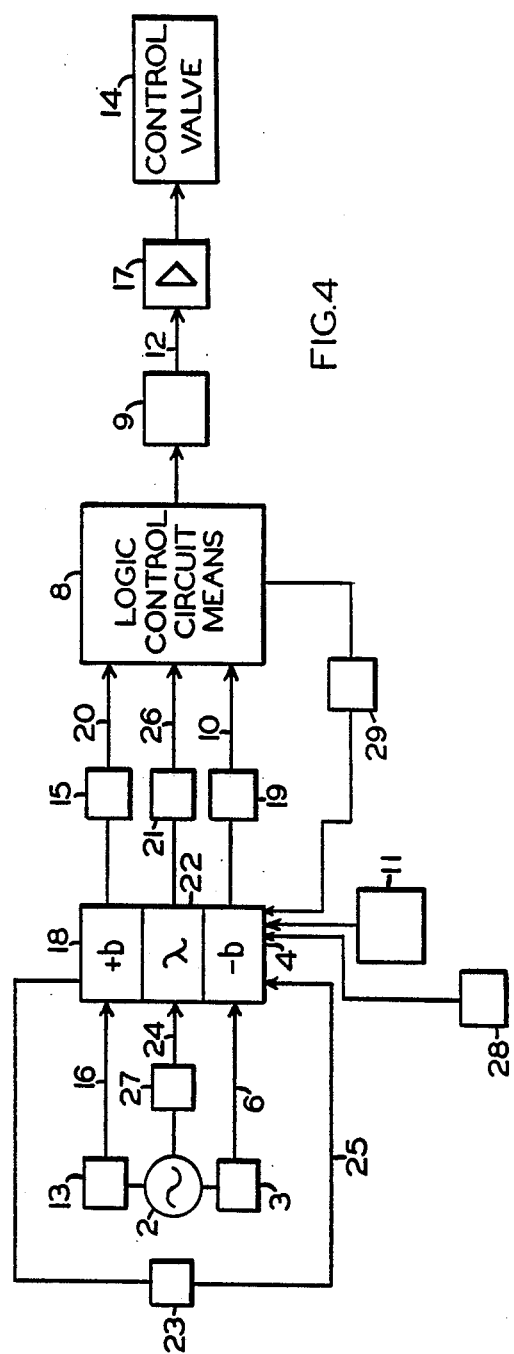
FIG. 4 is a schematic representation, in a simplified block form, of the antilocking mechanism which is constructed according to the present invention.

As shown in FIG. 4, th antilocking mechanism, according to this embodiment, includes a speed sensing means 2 secured to the motor vehicle in a position to determine the rotational velocity of each respective wheel. A first signal generating means 3 is connected to the speed sensor 2. The first signal generator 3 transmits a first signal having a value that is at least representative of a deceleration of a respective wheel, via line 6, to a signal evaluation and detection means 4. The signal evaluation and detection means 4 evaluates such first signal with respect to a first threshold value, which is larger than a normally favorable value in a controlled braking appplication on the motor vehicle. Further, the signal evaluation and detection means 4 detects when a respective wheel velocity is starting to separate from a wheel vehicle reference velocity. After the first signal is evaluated, a signal representative of a current status of the respective wheel velocity is transmitted by a signal transmitter 19, via line 10, from the signal evaluation and detection means 4 to a logic control circuit means 8 which according to a preset program, generates an antilock control signal when the first signal value exceeds the threshold value. An antilock control signal transmitting means 9 is connected to the logic control circuit means 8, and transmits the antilock control signal generated therein to a respective solenoid control valve 14 via line 12. The solenoid control valve 14 adjusted a brake pressure on such respective wheel in response to such antilock control signal, as required. Connected to the signal evaluation and detection means 4 is a decrement means 11, which decreases the first threshold value in stages when the respective wheel velocity separates from the vehicle reference velocity. Further included in the presently preferred embodiment is a signal amplifying means 17, which is connected intermediate the logic control circuit means 8 and the solenoid control valve 14 to amplify such antilock control signal being transmitted via line 12.

A second signal generating means 13 is connected to each sensing means 2 for generating a second signal which has a value representative of an acceleration of such respective wheel. This second signal value is transmitted via line 16 to a signal evaluation means 18, which evaluates the signal value received with respect to an acceleration second threshold value. A signal transmitting means 15 transmits, via line 20, an evaluated second signal to the logic control circuit means 8 when such second signal exceeds the acceleration second threshold value.

In the most preferred embodiment of the invention, a wheel slippage evaluation device 22 is provided. Wheel slippage evaluation device 22 is connected to receive a signal transmitted by signal transmitter 27 over line 24. A wheel slippage signal is transmitted by transmitter 21 over line 26 to the logic control circuit means 8 form the wheel, slippage evaluation device 22 when, after evaluation, it is determined that the wheel slippage exceeds a predetermined threshold value. In this embodiment, the antilock control signal is transmitted to the solenoid control valve 14 only when the deceleration signal, the acceleration signal, and the wheel slippage signal exceed their respective threshold values.

While both presently preferred and alternative embodiments of the present invention have been described in detail, it should be obvious to those persons skilled in the braking art that other modifications and adaptations can be made without departing from the spirit and scope of the attached claims.

I claim:

1. A motor vehicle fluid pressure responsive braking system antilocking mechanism, which prevents locking of an individual brake on such motor vehicle by providing a respective antilock control signal to a plurality of respective solenoid control valves, secured to such motor vehicle in a position to control fluid pressure response to a respective brake cylinder associated with each respective wheel on such motor vehicle, said braking system antilocking mechanism comprising:
   (a) a plurality of wheel velocity sensing means secured to such motor vehicle in a position for sensing rotational velocity of such each respective wheel;
   (b) a first signal generating means, connected to each of said plurality of sensing means, for generating a first signal having a value that is at least representative of a deceleration of such each respective wheel;
   (c) a signal evaluating and detection means connected to receive said first signal for (1) evaluating said first signal with respect to a first threshold value which is larger than a normally favorable value in a controlled braking application on such motor vehicle; and (2) detecting when a respective wheel velocity is beginning to separate from a wheel vehicle reference velocity;
   (d) a logic control circuit means, connected to receive a signal from said first signal evaluating and detection means for generating an antilock control signal, according to a preset program, when said first signal value exceeds said threshold value;
   (e) an antilock control signal transmitting means, connected to said logic control circuit means and to such respective solenoid control valves, for transmitting said antilock control signal to such respective solenoid control valves to thereby adjust fluid pressure response in such respective brake cylinder; and
   (f) decrement means, connected to said signal evaluating and detection means, for decreasing said first threshold value in stages when said respective wheel velocity separates from said vehicle reference velocity.

2. A motor vehicle fluid pressure responsive braking system antilocking mechanism, according to claim 1, wherein said antilock control signal transmitting means further includes a signal amplifying means, connected intermediate said logic control circuit means and such respective solenoid control valve, for amplifying said antilock control signal prior to transmission to such respective solenoid control valve.

3. A motor vehicle fluid pressure responsive braking system antilocking mechanism, according to claim 1, wherein said antilocking means further comprises:
   (a) a second signal generating means, connected to each of said plurality of sensing means, for generating a second signal having a value that is representative of an acceleration of such each respective wheel;
   (b) a signal evaluation means, connected to receive said second signal, for evaluating said second signal with respect to an acceleration second threshold value;
   (c) a signal transmitting means, connected to said signal evaluation means and to said logic control circuit means, for transmitting an evaluated second signal to said logic control circuit means when said evaluated second signal exceeds said acceleration second threshold value; and
   (d) a signal transmitting means, connected to said signal evaluation means and said signal evaluation and detection means, for transmitting said evaluated second signal to said signal evaluation and detection means, so that connection of said first threshold value will be instituted when a wheel acceleration, caused by an axle oscillation, exceeds a predetermined value.

4. A motor vehicle fluid pressure responsive braking system antilocking mechanism, according to claim 3, wherein said wheel velocity sensing means and said first signal generating means are incorporated into a single unit.

5. A motor vehicle fluid pressure responsive braking system antilocking mechanism, according to claim 4, wherein said single unit further includes said second signal generating means.

6. A motor vehicle fluid pressure responsive braking system antilocking mechanism, according to claim 5, wherein said antilocking mechanism further comprises a wheel slippage evaluation device, connected to receive a signal from said single unit and to transmit a wheel slippage signal to said logic control circuit means when said wheel slippage exceeds a predetermined threshold value, said logic control circuit means transmits said antilock control signal only when said deceleration signal and said acceleration signal and said wheel slippage signal exceed their respective threshold values.

7. A motor vehicle fluid pressure responsive braking system antilocking mechanism, according to claim 6, wherein said signal evaluating and detection means and said signal evaluation means and said wheel slippage evaluation device are incorporated into a single unit.

8. A motor vehicle fluid pressure responsive braking system antilocking mechanism, according to claim 7, wherein said signal evaluating and detection means further includes a means for adjusting said first threshold value to a relatively high value when such motor vehicle is undergoing normal operation, thereby suppressing said signal from said signal evaluating and detection means.

9. A motor vehicle fluid pressure responsive braking system antilocking mechanism, according to claim 8, wherein said antilocking mechanism further comprises a means for transmitting a signal from said logic control circuit means to said signal evaluating and detection means, so that increase of said first threshold value is inhibited during a continuous controlled braking of such motor vehicle.

10. A method to prevent locking of an individual brake in a motor vehicle fluid pressure responsive braking system, said method comprising the steps of:
   (a) determining a rotational velocity of each respective wheel on such motor vehicle;
   (b) generating a first signal value that is representative of said rotational velocity determined in step (a);
   (c) determining at least when a deceleration of such each respective wheel occurs from said first signal generated in step (b);
   (d) evaluating said first signal with respect to a first threshold value which is larger than a normally favorable value in a controlled braking application of such motor vehicle when a deceleration of such each respective wheel is determined in step (c);

(e) detecting when a respective wheel velocity starts to separate from a vehicle reference velocity;

(f) generating an antilock control signal, according to a preset program in a logic control circuit device, when said first signal evaluated in step (d) exceeds said first threshold value;

(g) transmitting said antilock control signal, generated in step (f), to respective solenoid control valves;

(h) adjusting fluid pressure in respective brake cylinders in response to such solenoid control valves; and (i) decreasing said first threshold value in stages in step (d) when said respective wheel velocity starts to separate from said vehicle reference velocity detected in step (e).

11. A motor vehicle fluid pressure responsive braking system antilocking mechanism, according to claim 10, wherein said method includes the additional step of amplifying said antilock control signal generated in step (f) prior to transmitting in step (g).

12. A motor vehicle fluid pressure responsive braking system antilocking mechanism, according to claim 11, wherein said method includes the additional steps of:

(a) generating a second signal value that is representative of an acceleration of such each respective wheel;

(b) evaluating said second signal value with respect to an acceleration second threshold value;

(c) transmitting said evaluated second signal value to said logic control circuit device when said evaluated second signal value exceeds said acceleration second threshold value; and (d) transmitting said evaluated second signal value to a device which will allow connection of said first threshold value when a wheel acceleration, caused by axle oscillation, exceeds a predetermined value.

13. A motor vehicle fluid pressure responsive braking system antilocking mechanism, according to claim 12, wherein said method includes the additional steps of:

(a) determining wheel slippage of each such respective wheel;

(b) transmitting a wheel slippage signal to said logic control circuit device when said wheel slippage exceeds a predetermined threshold value; and (c) transmitting said antilock control signal only when said deceleration signal and said acceleration signal and said wheel slippage signal exceed their respective threshold values.

14. A motor vehicle fluid pressure responsive braking system antilocking mechanism, according to claim 13, wherein said method includes the additional step of adjusting said first threshold value to a relatively high value when such motor vehicle is undergoing normal operation.

15. A motor vehicle fluid pressure responsive braking system antilocking mechanism, according to claim 14, wherein said method includes the additional step of inhibiting increase of said first threshold value during a continuous controlled braking of such motor vehicle.

* * * * *